Feb. 11, 1958　　　A. W. RICHARDS　　　2,822,898
JOINT AND CONNECTOR USED THEREIN
Filed Jan. 7, 1955　　　　　　　　　　　　2 Sheets-Sheet 1
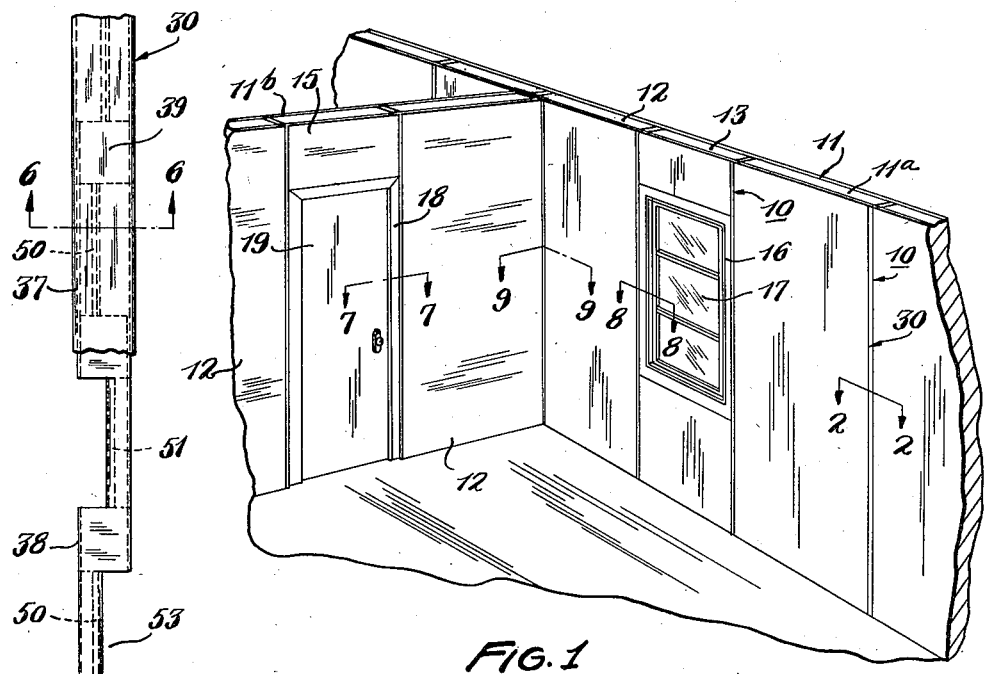
FIG. 1
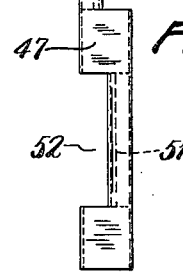
FIG. 5
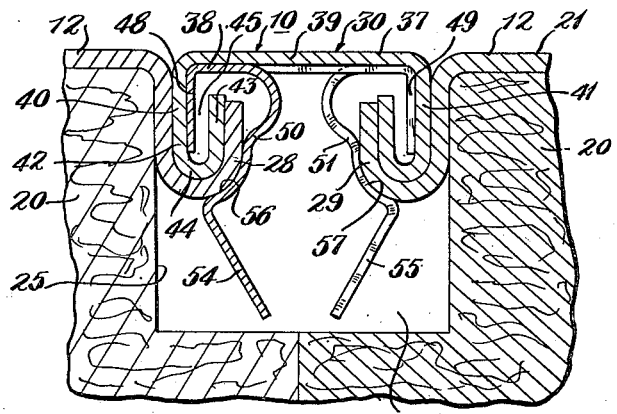
FIG. 3
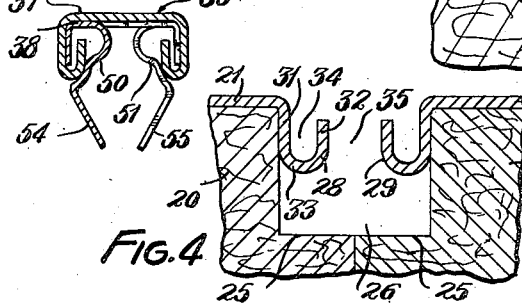
FIG. 6
FIG. 4
INVENTOR.
ARCHER W. RICHARDS
BY Hudson, Boughton,
Williams, David & Hoffmann
ATTORNEYS Feb. 11, 1958 A. W. RICHARDS 2,822,898
JOINT AND CONNECTOR USED THEREIN
Filed Jan. 7, 1955 2 Sheets-Sheet 2
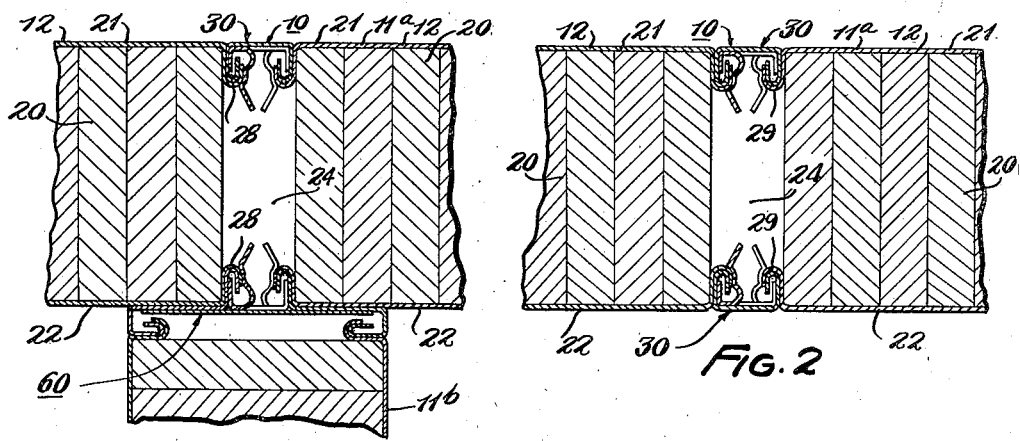
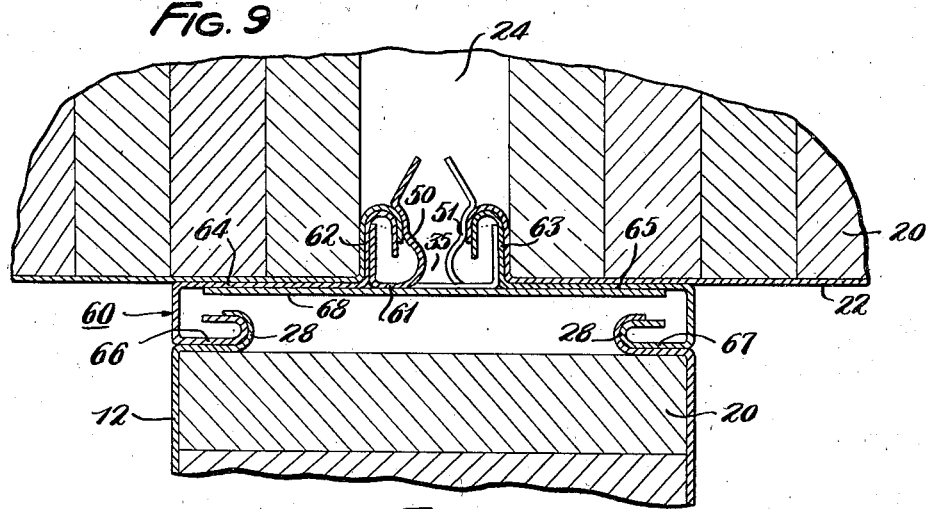
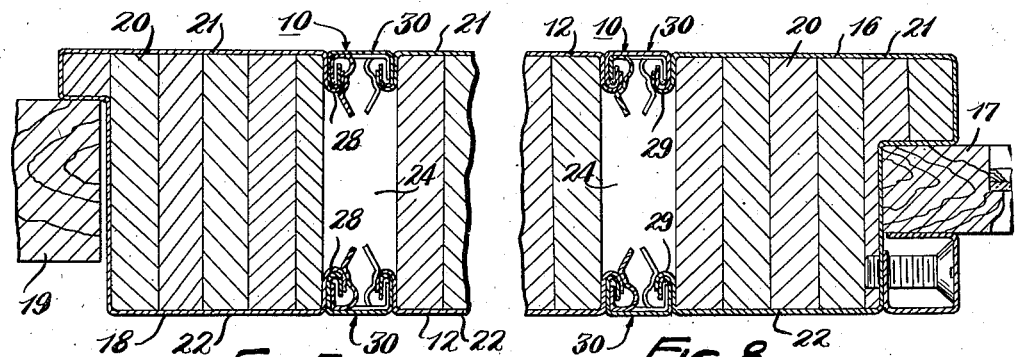
INVENTOR.
ARCHER W. RICHARDS
BY Hudson, Boughton,
Williams, David & Hoffmann
ATTORNEYS

United States Patent Office 2,822,898
Patented Feb. 11, 1958

2,822,898

JOINT AND CONNECTOR USED THEREIN

Archer W. Richards, Chagrin Falls, Ohio

Application January 7, 1955, Serial No. 480,503

8 Claims. (Cl. 189—36)

This invention relates to joints for wall panels, and other members to be connected, and to a connector for use in such joints.

As one of its objects, this invention provides a joint structure and connector of a relatively simple and inexpensive construction well suited for use in connecting wall units and other members, and in which the connector is movable to its engaged position simply by being pushed directly into a crevice or slot between such members, as distinguished from joint structures and connectors of the kind in which the application of the connector requires special tools or in which the connector must be threaded endwise into the joint.

Another object is to provide a joint of the kind above referred to comprising spaced-apart hook elements, preferably hook-shaped flanges, and a connector having portions engageable in the hook flanges and also having projecting retaining elements extending between and beyond the hook flanges.

Still another object is to provide a joint of the character above mentioned in which the connector is a channel-shaped member comprising a cover strip having flanges engageable in the hook flanges and a locking strip retained in the cover strip and carrying the retaining elements.

A further object is to provide such a joint structure and connector in which the retaining elements are resilient and are preferably formed by partially sheared portions of the locking strip.

Yet another object is to provide a joint structure and connector of the kind mentioned above in which the retaining elements have holding ledges thereon and are self-spreading for moving such ledges into engagement with external portions of the hook flanges.

Additionally, this invention provides a joint structure and connector of the character referred to above in which the flanges of the cover strip are double-walled flanges and the locking strip is retained in the cover strip by engagement of its flange portions in such double-walled flanges.

The invention can be further briefly summarized as consisting in certain novel combinations and arrangements of parts hereinafter described in detail and particularly set out in the claims hereof.

In the accompanying sheets of drawings forming a part of this specification:

Fig. 1 is a perspective view showing building wall construction embodying the joint structure and connector of the present invention;

Fig. 2 is a horizontal section taken across one of the joints of the wall structure of Fig. 1, the view being taken as indicated by section line 2—2 thereof;

Fig. 3 is a transverse section taken across one side of a joint of the kind shown in Fig. 2 but showing the joint structure and connector on a larger scale;

Fig. 4 is a transverse section similar to that of Fig. 3 but with the connector omitted;

Fig. 5 is a plan view of the connector in detached relation and with a portion of the cover strip broken away;

Fig. 6 is a transverse section of the connector taken on section line 6—6 of Fig. 5;

Fig. 7 is a transverse section through a portion of the wall of Fig. 1 at the location of a door frame, the section being taken as indicated by section line 7—7;

Fig. 8 is a similar section taken at the location of a window frame and as indicated by section line 8—8 of Fig. 1;

Fig. 9 is a transverse section taken through a corner portion of the wall and as indicated by section line 9—9 of Fig. 1; and Fig. 10 is a sectional view corresponding with a portion of Fig. 9 but showing the same on a larger scale.

The joint 10 of the present invention can be used for a variety of connecting purposes and, by way of example, is shown in the drawings as being used for connecting wall units or panels of a wall structure 11 which is here shown as comprising an outside wall 11$^a$ and a partition wall 11$^b$.

The outside wall 11$^a$ comprises a plurality of edgewise aligned upright plain panels 12, and a window panel 13 disposed between the adjacent edges of a pair of the plain panels. The plain panels 12 and the window panel 13 have their adjacent edges connected by the joints 10 which will be presently described in detail. The partition wall 11$^b$ also comprises edgewise aligned upright plain panels 12 and a door panel 15 disposed between the adjacent edges of a pair of the plain panels. The window panel 13 carries a window frame 16 having sash 17 therein. The door panel 15 carries a door frame 18 having a door 19 mounted therein for closing the door opening thereof.

The plain wall panels 12 which are here shown as being connected by the joint 10 comprise a slab 20 and metal surface sheets 21 and 22 secured to the slab on opposite sides thereof. The slab 20 is shown in Fig. 2 as being of a conventional cellular paper construction, and in Fig. 3 the slab 20 is shown as being of a solid form, such as a wood panel or a slab of fibrous heat-insulating material. When the panels 12 embody slabs 20 made of the above-mentioned cellular paper, the adjacent edges of two contiguous panels have a vertical longitudinal crevice 24 therebetween as shown in Figs. 2 and 7 to 10 inclusive. When the slabs 20 of the panels 12 are of a solid type, as shown in Figs. 3 and 4, the adjacent edges of two contiguous panels have rabbet recesses 25 therein which cooperate in defining an outwardly facing groove 26.

The joint 10 can be used on one or both sides of a wall formed by the panels 12, but is preferably used on both sides thereof as shown in Figs. 2 and 7 to 10 inclusive, so as to form a stronger connection between contiguous panels and a connection which will resist relative swinging or buckling between the connected panels.

The joint 10 comprises spaced-apart hook elements 28 and 29 carried by the members to be connected, in this instance the panels or wall units, and a connecting strip or connector 30 engageable with the hook elements. The hook elements 28 and 29 are preferably in the form of flanges of a hook-shaped cross-section which are formed by edge portions of the metal surface sheets 21 of the wall panels 12 and can be conveniently referred to merely as hook flanges.

As shown in Figs. 3 and 4, the hook flanges 28 and 29 are double-walled flanges whose parallel walls 31 and 32 are connected by a convex rear connecting portion 33 and define a channel recess 34 facing outwardly of the crevice 24 or the groove 26, as the case may be, that is facing toward a common plane in which the surface sheets 21 of the panels lie. The hook flanges 28 and 29 are formed on the surface sheets 21 in an inwardly offset relation so as to lie in the crevice or slot inwardly of the common plane of the surface sheets and with an intervening space 35 between the walls 32 of these hook flanges.

The connector 30 is preferably a two-part member comprising a cover or base strip 37, and a locking strip 38. The cover strip 37 is a channel-shaped strip having a longitudinal web or connecting portion 39 and a pair of spaced-apart longitudinal double-walled edge flanges 40 and 41 connected by such web. The flanges 40 and 41 each comprise parallel walls 42 and 43 connected by a convex connecting portion 44 so as to contain an outwardly facing longitudinal channel recess 45.

The locking strip 38 is also a channel-shaped strip comprising a web portion 47 and a pair of spaced-apart longitudinal edge flanges 48 and 49 which are carried on and connected by such web portion. The locking strip 38 is also provided with locking elements or retaining fingers 50 and 51 fitted against the web 39 of the cover strip and extending inwardly in the same general direction as the edge flanges 48 and 49.

As shown in Figs. 3 and 5, the cover strip 37 of the connector 30 is a continuous channel-shaped strip, whereas the locking strip 38 has interruptions 52 and 53 formed therein in alternating relation, that is with the interruptions 52 being formed in the edge flange 48 and the interruptions 53 being formed in the edge flange 49. The locking elements 50 and 51 are formed by sections of metal which have been partially sheared from the flange and web portions of the locking strip 38.

Thus, as seen in Figs. 3 and 5, the locking elements 50 and 51 are formed by partially sheared metal which has been displaced from the interruptions 52 and 53, the locking elements 50 being formed by partially sheared metal which has been displaced from the interruptions 53 and the locking elements 51 being formed by partially sheared metal which has been displaced from the interruptions 52.

The locking elements 50 and 51, as thus formed, extend inwardly from the web 47 of the locking strip 38 between the flanges 48 and 49 thereof, such that the locking elements are in a staggered longitudinally spaced relation. These locking elements are of a length such that they extend inwardly for a distance considerably beyond the edge flanges 48 and 49.

The locking strip 38 is disposed in the cover strip 37 with the web portion 47 of the locking strip lying against the inner face of the web 39 of the cover strip and is retained in the cover strip by the edge flanges 48 and 49 being disposed in the channel recesses 45 of the double-walled edge flanges 40 and 41 of the cover strip. The locking strip 38 can be assembled in the cover strip 37 in any one of various ways, such as by forming the double-walled edge flanges 40 and 41 of the cover strip around the edge flanges 48 and 49 of the locking strip, or by a longitudinal endwise movement of the locking strip into the cover strip. The locking strip is tempered or heat-treated after the forming of the locking elements 50 and 51 thereon, so that these elements will be springlike or resilient in character.

The connector 30 is applied to the hook flanges 28 and 29 of the members to be connected by engaging the flanges 40 and 41 of the connector in the channel recesses 34 of the hook flanges with the connecting portions 44 becoming seated in the bottoms of these channel recesses. By the same inward movement of the edge flanges 40 and 41 of the connector 30 into the channel recesses 34 of the hook flanges 28 and 29, the locking elements 50 and 51 are moved inwardly between and beyond the hook flanges through the space 35. During the movement of the locking elements through the space 35, these elements are sprung or deflected toward each other, that is, toward the longitudinal mid-plane of the connector, but when the connector 30 is in its fully engaged position, as shown in Fig. 3, the self-spreading resilient action of the locking elements causes them to engage external portions of the hook flanges for retaining the connector in its applied position.

The locking elements 50 and 51 are shaped so as to have inwardly converging inclined flat cam portions 54 and 55 thereon which act as lead elements and facilitate the insertion of the locking elements through the space 35. The intermediate portions of the locking elements 50 and 51 are shaped so as to form ledges 56 and 57 which engage external portions of the hook flanges 28 and 29, such that the inner convex portions of the hook flanges form abutment shoulders with which these ledges of the locking elements cooperate for retaining the connector 30 in its fully applied position.

When the connector 30 is in its fully applied position as shown in Fig. 3, the flanges of the cover strip 37 are seated in the hook flanges 28 and 29, such that the cover strip forms a strong connecting member between the adjacent panels and is retained in its connecting position by the self-spreading locking means formed by the locking elements 50 and 51 of the locking strip 38.

Although the connector 30 has been disclosed herein as a two-part member comprising a cover strip and a locking strip, it should be understood that the connector may consist of only a single channel-shaped strip having edge flange portions adapted to engage in the channel recesses of the hook flanges and partially sheared locking elements adapted to extend between and beyond the hook flanges and having holding engagement with external portions of the latter. The locking strip 38 with the cover strip 37 omitted would constitute such a one-piece connector. However, this would obviously leave an unfinished appearance due to the offset interrupting portions 52 and 53 shown particularly in Fig. 5.

In Fig. 7 of the drawings, the connectors 30 are shown as being used in joints 10 which connect the door frame 18 with an adjacent wall panel 12. In this portion of the wall construction, the pair of hook flanges 28 of the joints 10 are carried by the door frame 18.

In Fig. 8 of the drawings, the connectors 30 are shown as being used in joints 10 which connect the window frame 16 with an adjacent wall panel 12. In this portion of the wall construction, the pair of hook elements 29 of the joints 10 are carried by the window frame 16.

Figs. 9 and 10 show a modified form of the joint 10 in which a connector 60 of a somewhat different form is used to connect the partition wall 11$^b$ with the outside wall 11$^a$. In the connector 60, a locking strip 61 is used which is identical with the locking strip 38 but is located on the mid-plane of the partition wall and is mounted in a pair of double-walled flanges 62 and 63 which are carried by a pair of sheet metal adapter members 64 and 65.

The adapter members 64 and 65 are strips extending in parallel relation along the abutting vertical edge of the panel 12 and, at their outer edges, carry double-walled flanges 66 and 67 which are engageable in the hook flanges 28 of the partition wall panel 12. The adapter strips 64 and 65 are connected by a flat sheet metal connecting strip 68 to which they are spot-welded, or otherwise suitably secured, with the connecting strip extending in spanning relation across the web portion of the locking strip 61.

The modified connector 60 thus comprises an adapter which is applied to the hook flanges 28 of the partition wall panel 12 prior to the moving of this panel into abutting relation with the outside wall 11$^a$. When the partition wall panel carrying the connector 60 is ready to be attached to the outside wall 11$^a$, the locking elements 50 and 51 of the adapter are inserted through the space 35 defined between the hook flanges 28 and 29 of the pair of outside wall panels 12 to which the partition wall 11$^b$ is being joined.

If it should be desirable to disassemble the panels and the door and window units of the wall structure 11, this can be readily done since the connectors 30 and 60 can be disengaged from the hook flanges 28 and 29 by simply withdrawing the locking elements 50 and 51 from between the pairs of hook flanges. The withdrawal of the locking elements from between the hook flanges can be accomplished by a suitable pulling tool applied to the cover strip 37 of the connector 30, or by wedging the connector 60 away from the adjacent wall panels 12. Such disassembled wall panels and units, and the disengaged connectors 30 and 60, suffer no damage in the disassembling operation and can, therefore, be immediately re-used in other wall constructions.

From the foregoing description and the accompanying drawings, it will now be readily understood that this invention provides a joint structure and connector which are relatively simple and inexpensive to manufacture and which can be quickly and easily assembled for connecting various members or devices desired to be connected. It will now also be seen that the joint structure and connector provided by this invention will afford a strong connection between wall panels or units, or other members connected thereby, and will also permit quick and easy disassembly of the connected members with the various components in an undamaged condition and ready for immediate re-use. Additionally, it will be seen that the characteristics of the joint structure and connector of this invention are such that the connector is adapted to be assembled by a direct forward movement of the connector into the crevice or slot between the adjacent portions of the members to be connected, and that this assembly operation can be carried out quickly and easily and without need for any special tools nor any threading of the connector endwise thereof into the joint crevice as has been required heretofore in various other joint structures.

Although the joint structure and connector of this invention have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. A joint of the character described comprising, a pair of spaced substantially coextending hook elements defining substantially parallel channel recesses facing in the same direction, a substantially channel-shaped connecting strip having a web portion spanning the space between said hook elements and substantially parallel flanges engaged in said recesses, and locking elements projecting into said space alternately from opposite sides of said strip and having holding engagement with said hook elements on the outside of the latter with adjacent locking elements engaging different ones of said hook elements.

2. A joint as defined in claim 1 in which said locking elements are resiliently flexible self-spreading elements.

3. In a joint of the character described, a pair of hook flanges spaced apart by an intervening slot, connecting strip means having flange members engaged in said hook elements, and a plurality of locking elements carried by and adjacent opposite sides of said strip means and extending into holding engagement with external portions of said hook flanges through said slot the locking elements adjacent one side of said strip means being in alternate relation to the locking elements adjacent the other side of said strip means.

4. A joint as defined in claim 3 in which said locking elements are formed by deflected segments partially sheared from said flange members, the locking elements deflected from one of said flange members being in alternating relation with the locking elements deflected from the other of said flange members.

5. A joint as defined in claim 3 in which said locking elements are resilient and have inwardly convergently inclined cam portions thereon for facilitating movement of the locking elements through said slot.

6. A connector of the character described comprising, a pair of coextending nested strips one of which is a cover strip having spaced-apart longitudinal flanges and the other is a locking strip retained in said cover strip and having a plurality of retaining elements adjacent opposite sides of said locking strip and projecting from the locking strip between and beyond the flanges of said cover strip with elements adjacent one side of said strip alternated with the elements adjacent the other side of said strip.

7. A connector for adjacent wall panels having spaced edge portions provided with rigid spaced substantially coextending hooked flange elements defining parallel channel recesses facing in the same direction, said connector including a channel-shaped connecting strip having a web portion spanning the space between said hooked flange elements and having parallel flanges engaged and tightly fitting said channel recesses, and a locking member comprising a strip extending longitudinally of said connecting strip and having side flanges fitting within the flanges of said connecting strip and having integral resilient retaining elements formed of longitudinally spaced sections extending from opposite sides of said locking strip and shaped to project between said first mentioned channels and biased to spread into holding engagement with the hook elements formed thereby.

8. The connector defined in claim 7 in which the resilient retaining elements comprise a plurality of longitudinally aligned separate resilient members extending from opposite sides of the locking member strip, and inwardly from the connecting strip, and said retaining elements having their inner ends sloped to converge inwardly, and also having portions shaped to engage the hooked flange elements.

References Cited in the file of this patent

UNITED STATES PATENTS

| 1,962,826 | MacDonald | June 12, 1934 |
| 2,068,562 | Murphy et al. | Jan. 19, 1937 |
| 2,140,887 | Tinnerman | Dec. 20, 1938 |
| 2,165,412 | Place | July 11, 1939 |
| 2,275,119 | Wiley | Mar. 3, 1942 |

FOREIGN PATENTS

| 381,771 | Great Britain | Oct. 13, 1932 |